(No Model.) 2 Sheets—Sheet 1.
C. W. WILLIAMS, G. S. BARNUM & E. B. IVES.
APPARATUS FOR MAINTAINING ELECTRICAL CONNECTION BETWEEN A MOVING AND A STATIONARY ELECTRICAL INSTRUMENT.
No. 309,274. Patented Dec. 16, 1884.
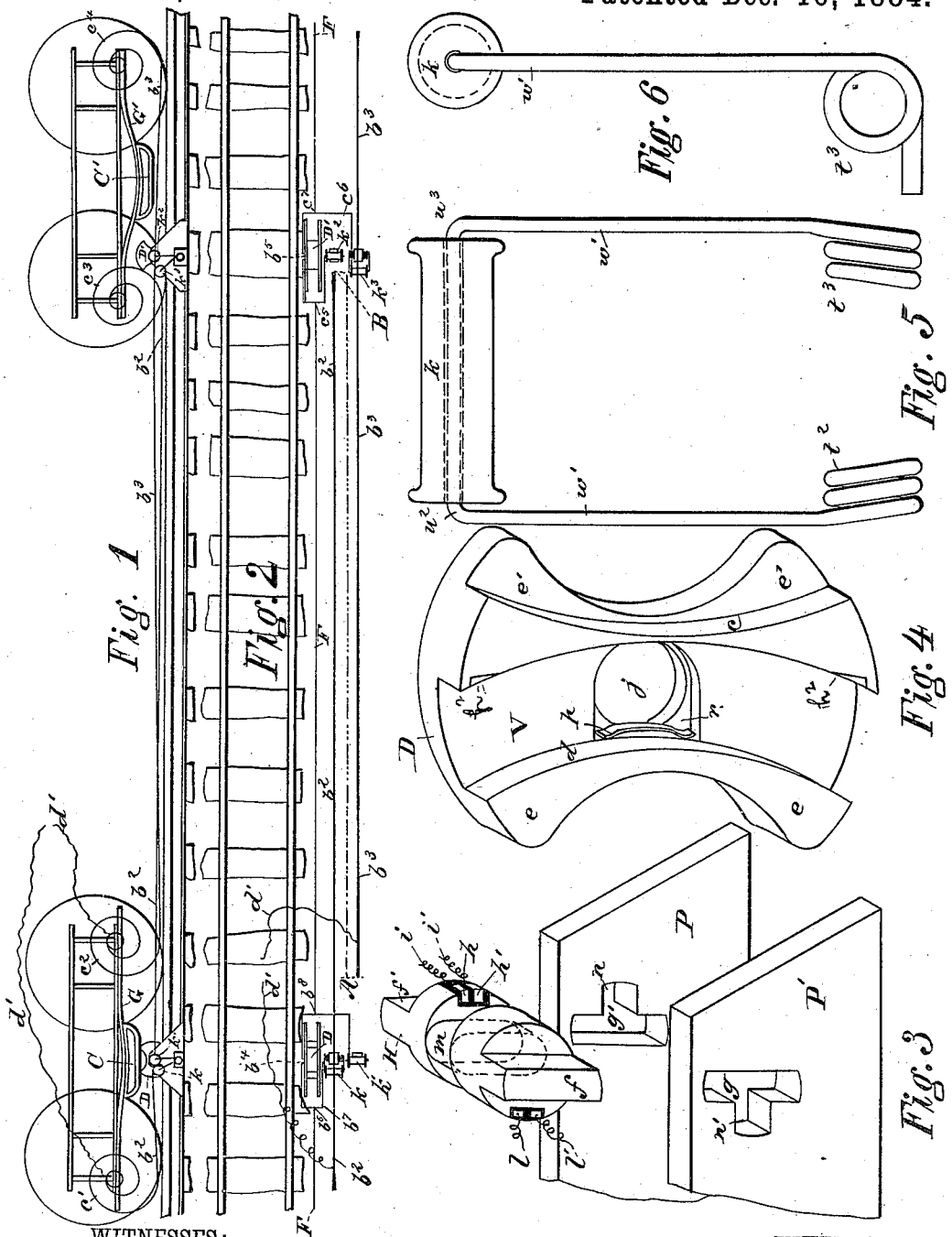
WITNESSES:
INVENTOR
Charles W. Williams
George S. Barnum
and Edward B. Ives
BY
their ATTORNEY (No Model.) 2 Sheets—Sheet 2.
C. W. WILLIAMS, G. S. BARNUM & E. B. IVES.
APPARATUS FOR MAINTAINING ELECTRICAL CONNECTION BETWEEN A MOVING AND A STATIONARY ELECTRICAL INSTRUMENT.
No. 309,274. Patented Dec. 16, 1884.
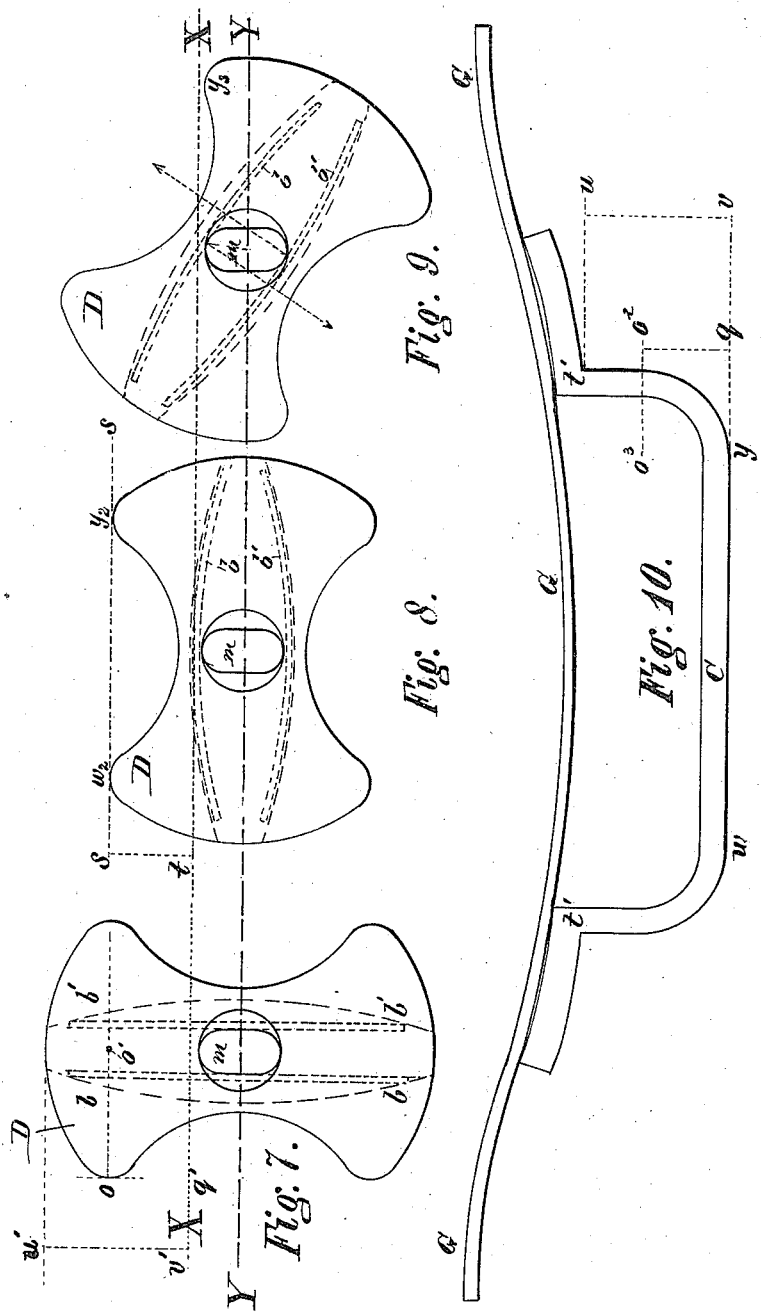
WITNESSES:
INVENTOR
Charles W. Williams
George S. Barnum
and Edward B. Ives
BY
their ATTORNEY

UNITED STATES PATENT OFFICE.

CHARLES W. WILLIAMS, OF CAVE CITY, KENTUCKY, GEORGE S. BARNUM, OF ATLANTA, GEORGIA, AND EDWARD B. IVES, OF NEW YORK, N. Y.

APPARATUS FOR MAINTAINING ELECTRICAL CONNECTION BETWEEN A MOVING AND A STATIONARY ELECTRICAL INSTRUMENT.

SPECIFICATION forming part of Letters Patent No. 309,274, dated December 16, 1884.

Application filed July 10, 1883. (No model.)

*To all whom it may concern:*

Be it known that we, CHARLES W. WILLIAMS, of Cave City, Barren county, in the State of Kentucky, GEORGE S. BARNUM, of Atlanta, in the county of Fulton and State of Georgia, and EDWARD B. IVES, of the city, county, and State of New York, have jointly invented a new and useful Improvement in Apparatus for Maintaining Electrical Connection between a Moving and a Stationary Electrical Instrument, of which the following is a specification, reference being had to the accompanying drawings, forming part of the same, in which—

Figure 1 is a side elevation of a piece of a railroad-track, two pairs of car-trucks thereon, and our devices for breaking the main circuit and shunting it through the car. Fig. 2 is a plan of the said track and said devices, and the remaining four figures are detail views of the said devices, to be fully described hereinafter.

The object of our invention is to establish and maintain an unbroken electric circuit from a battery or electric generator on the ground through one or several electrical apparatus on a railroad-car and another electrical apparatus not on the same car. We accomplish this object by shunting the current from the main line into the car by breaking the main line and connecting the extremities thus broken by an electrical conductor passing through the car, and the construction and arrangement of the devices we employ are such that at all times while the car is moving the main line will be broken at a point underneath the car, and metallic connection is maintained through the car between the severed ends of the main circuit. The means by which all this is effected consist of, first, devices, which we call "key-blocks," placed at approximately equal distances along the main conductor, and through which, in the normal condition of affairs, the electric current flows uninterruptedly; second, devices called "shoes" attached to the car, by means of which, in connection with the key-blocks, the main circuit is broken and restored; and, third, an arrangement for establishing through the car a metallic connection between the ends of the broken main circuit at the key-blocks when the circuit is broken. There are two shoes identical in form, attached, respectively, to the same side of the front and rear trucks of the same car. The key-blocks are then placed so as to be struck by the shoes as the car moves along, and at distances apart less than the distance between the shoes, so that as the car moves along there will always be at least one key-block somewhere between the shoes.

The mechanical construction of the shoes and key-blocks is such that a "closed" block when struck by a shoe is invariably "opened" and an "open" block is invariably "closed," and this no matter from what direction the blow of the shoe comes. The effect of this is obvious. The main conductor will always stand broken between the shoes. During the period that any block stands open the extremities of the broken main conductor by a special device terminate in metallic spools or rollers. On the car, from shoe to shoe, are stretched two metallic strips, which, as the car moves along, roll each on one of the above-mentioned spools. These strips are connected by a wire passing through an electrical apparatus on the car. It is now evident that although there is at the key-block between the shoes a break in the main conductor, yet the electric current flows uninterruptedly, the circuit being complete by way of the spools, the metallic strips, and the wire of the electrical apparatus. The length of these strips being greater than the distance apart of the key-blocks, at no time will a key-block be open; or, what is the same thing, at no time will the main conductor be broken without the strips bearing on the corresponding pair of spools, and thus at no instant will the electric current cease to flow through the car. This is apparent from the fact that before the metallic strips shall have passed off one pair of spools they will have come on the succeeding pair. This statement will be slightly modified hereinafter.

For convenience of construction the key-block D may consist of two pieces of metal, each being of the shape shown in isometric projection in Fig. 4. The two pieces are symmetrical, and will dovetail together, the surface $d$ of one piece fitting against the surface $c$ of the other, and the surface $e\ e$ fitting into the recess $e'\ e'$. There will then be a hollow cavity inside this mass of metal, the outlines of which are indicated by the outer dotted lines in D, Figs. 7, 8, and 9. The whole arrangement is then bound together by rivets or bolts, or in any other suitable way. This combination is fitted to rotate on an axle whose shape is shown at H, Fig. 3. This axle is held rigid between two plates, P and P', Fig. 3, which have mortises cut in them at $g$ and $g'$, into which fit the tenons $f$ and $f'$ of the axle. The central part of the axle is cut, as shown at $m$, Fig. 3, so that its cross-section has the form of a rectangle terminating in two semicircles, as shown at $m$, $m$, and $m$, Figs. 7, 8, and 9. On the two flat faces of this cut part $m$, Fig. 3, of the axle two straight springs, $b\ b'$, bear and hold the combination erect, as at Fig. 7. The plates P and P' are bolted together, so as to hold the axle rigid, and the whole arrangement attached to a cross-tie or a wooden pedestal especially prepared for it far enough away from the rail as not to be struck by any part of the train. The axis of the axle is placed perpendicular to the rail and in a horizontal plane tangent to its top surface. Y Y, Figs. 7, 8, and 9, represent the level of the rail. A notch is cut into one side of one of the cylindrical parts of the axle, and is filled with an insulating material. In this insulating material are partially embedded two brass studs, $h$ and $h'$, Fig. 3, to which are soldered two wires, $i$ and $i'$, Fig. 3. These wires, when the whole device is assembled, pass through a notch, $n$, cut in the mortise $g$, Fig. 3. The main conducting-wire F is brought up and attached to the wires $i$ and $i'$. It is now evident that when there is a metallic connection between the studs $h$ and $h'$, Fig. 3, the electric circuit is complete through the main conductor, and whenever the metallic communication between the said studs is broken the circuit through the main conductors is interrupted. This is accomplished by cutting, as represented in Fig. 4, a recess, $r$, in the inner face of the key-block adjacent to the central axial opening, $j$, and fixing in this recess a brass spring, $p$. This spring $p$ will rotate with the block, and in one position will bear on the studs $h$ and $h'$ and complete the circuit through the main conductors and said studs. When the movable part of the block is turned through one hundred and eighty degrees, the spring $p$ will be on the side of the axle opposite the studs $h$ and $h'$, Fig. 3, and the circuit will be broken. It is now seen that by having an arrangement to strike and turn this block, Fig. 4, exactly one hundred and eighty degrees and no farther at every blow the current through the main conductor will be alternately interrupted and restored. This arrangement for striking the metal block is called a "shoe," and is shown in Fig. 10. It consists of the shoe proper, of metal, of the shape shown at C, Fig. 10, which is firmly attached to a spring, G, and this spring is attached to the truck of the car, as shown plainly in Fig. 1. This shoe will have a vertical motion due to the play of the spring, but no other. Its lowest point is constant and but a short distance above the level of the rail, sufficient to clear the rail at switches and frogs. It is placed so that as the car moves along it will successively strike and turn over the key-blocks.

The combined action of the shoe and block is as follows: The general outline of the movable part of the key-block is shown at Figs. 7, 8, and 9. The mass of the metal is preferably so disposed that the direction of the line of impact through $o$ passes through $o'$, the center of gyration of the mass, thus reducing to a minimum the effect of the shock on the axle H, Fig. 3, and the key-block itself when the latter is struck by the shoe. The block must be struck full by the shoe in order to avoid any possibility of the sliding of the shoe over the block, and thus failing to turn it. For this reason the curve of the lowest part of the shoe must not commence above $o^2\ o^3$, Fig. 10, the distance $o^2\ q$, Fig. 10, being less than $o\ q'$, Fig. 7. The distance $u\ v$, Fig. 10, must be greater than $u'\ v'$, Fig. 7, for should that part of the shoe at $t'$, Fig. 10, come in contact with the block just as it has completed a semi-evolution the block is liable to be turned another one hundred and eighty degrees, which would restore it to the same position it had before being struck, and which would be equivalent to the shoe having failed to work that particular key-block.

X X, Fig. 7, is the path of the bottom of the shoe. The shoe, on striking the block at $o$, turns it through an angle of ninety degrees, until it assumes the position shown in Fig. 8 and rides along on the points $w^2\ y^2$. The springs $b\ b'$, which are inside the block, turn with it, and are spread open by the axle, as indicated at Fig. 8. Said springs are retained in the block by having their ends secured in the notches $h^2$, formed in said block. The bottom of the shoe now stands lifted up above its normal position the distance $s\ t$, Fig. 8. As the shoe slides along it leaves the point $w^2$, and the downward pressure of the spring G, Fig. 10, forces down the point $y^2$ until it assumes the position $y^3$ on the level of the line X X. The springs $b\ b'$ now bear on the oval axle, so as to produce a moment of rotation. (Indicated graphically at Fig. 9.) This carries the key-block through the remainder of the one hundred and eighty degrees. The distance $w\ y$, Fig. 10, is greater than $w^2\ y^2$, Fig. 8, so as to hold the block horizontal for an instant. This is done to check the centrifugal force of the rotating mass. The moment of inertia of this mass, when struck by a shoe attached to a train moving at a high rate of speed, is very great, and beyond the control of the springs $b\ b'$, and there would be a liability of the block being spun around several times under these circumstances. By having $wy$ greater than $w^2y^2$ the shoe checks the centrifugal force and insures certainty of action. The springs $b\ b'$ are made strong enough to prevent any careless or malicious person from turning the block over and interrupting the working of the line.

F, Fig. 2, indicates the main-circuit wire, which is stretched from block to block and joined at $b^4\ b^5$, Fig. 2, to the wires $i\ i'$. (Shown in Fig. 3.) From the point $b^6$ on F a branch, $b^7$, is carried to the spool $k$, and from the point $b^8$ a branch is carried to the metallic spool $k'$. Similar branches are provided at the other blocks—namely, from the point $c^5$ to the spool $k^2$, and from $c^7$ to the metallic spool $k^3$. For reasons already explained, the distance from $b^4$ to $b^5$, Fig. 2, must be less than from C to C', Fig. 1. The metallic strips $b^2$ and $b^3$, by which electrical connection is made between the said spools at one block and those at the next nearest block as the car passes over them, are composed each of a bundle of fine wires, preferably brass. They are stretched under the car between the trucks, and may be held taut and in position by strong volute-springs, to which the strips may be attached, one at each end. They are arranged in echelon, as shown, one of them, $b^2$, being attached at either end to the rear ends of the trucks, and the other, $b^3$, to the forward ends of the trucks, as shown in Fig. 1, in order to permit a certain latitude in the distance apart of the key-blocks as long as the blocks are not at a greater distance than the length of a strip, nor less than the distance A B, Fig. 2. The circuit will be complete through the car, as will be explained hereinafter. The said volute-springs are shown at $c'\ c^2\ c^3\ c^4$, Fig. 1. They are attached firmly to the trucks, at or near the places indicated in said figure, and are insulated from one another, the only electrical connection between them being by the wire $d'$, which passes through an electrical apparatus on the car.

The spools are shown in front and side views at Figs. 5 and 6. Each consists of a metallic spool, $k$. This spool turns on a steel wire, $w'$, bent down at $w^2$ and $w^3$, to keep the spool in place and terminating in two coil-springs, $t^2$ and $t^3$. The spools and wire are firmly attached to a wooden or other block, so as to allow the springs $t^2$ and $t^3$ full play. They are then placed in pairs in the vicinity of the key-blocks, as represented in Figs. 1 and 2 at $k\ k'$ and $k^2\ k^3$. Branch wires are carried from the main conductors to these spools, as before described, and indicated in Fig. 2.

The action of the whole system is now as follows: The circuit is complete through the key-blocks and the main conductor. The leading shoe opens the block D, Fig. 2, and as the car runs along the two metallic strips $b^2$ and $b^3$ each rides on its respective spool $b^2$ on $k$, and $b^3$ on $k'$. The current being interrupted at $b^4$ in block D, it is forced to follow the branch wire from $b^6$ to the spool $k$. From this spool it passes to the metallic strip or bundle of wires $b^2$. From this it proceeds by the wire $d'$ to the other strip, $b^3$, and then until strip 3 reaches spool $k^3$ it passes from spool $k'$ by branch wire to the main line at $b^8$. After said strip $b^3$ reaches spool $k^3$ and leaves spool $k'$ the current passes from said strip $b^3$ through spool $k^3$ and branch wire to main line at $c^7$. It is important that the said metallic strips for establishing constant and unbroken electrical connection between the described spool in the main-line wire and the wire running into and through the car should be flexible, as well as be capable of yielding vertically under an elastic pressure. These characteristics I secure by making the said strips, as described, of flexible wires or narrow strips of thin metal, and attaching their ends to springs fixed to the car-trucks, as shown and described, so that they shall be held taut, while they are at the same time flexible and yielding, to the end that the jarring and uneven motion of the trucks over the rails shall not cause a breaking at any instant of contact between the said strips and spools. If the key-block were closed, the current would flow by the shortest path from $b^6$ to $c^7$ through the block and the main conductor F; but since there is a break at $b^4$ it takes the long path through the car by way of the spools and metallic strips, as described. In the meantime the car moves on, the metallic strips $b^2$ and $b^3$ ride on the spools, and the electric current still flows through the car. The forward shoe, C', approaches the next block, D', and the foremost of the metallic strips $b^3$ come onto the spool $k^3$. It must do this before it leaves the spool $k'$, to prevent an instantaneous break in the circuit. The strip $b^2$ is now approaching the spool $k^2$. $b^3$ must, however, have left $k'$ before this takes place, as also must the foremost shoe have opened the block D', for with D' closed and the strip $b^2$ on $k$ and $k^2$ at the same time, and $b^3$ on $k'$ and $k^3$ at the same time, the current would pass from $b^6$ to $k$ onto the strip $b^2$, from $b^2$ to $k^2$, from $k^2$ to $c^5$, and from $c^5$ by way of the closed block D' to $c^7$, where it would flow onto the main conductor. From this we see that if the strip $b^2$ comes onto the spool $k^2$ before the block D' is opened, and before $b^3$ shall have left $k'$, there will be a period of short-circuiting, when the current will not flow through the car. By arranging the two metal strips in echelon, with the two shoes at points midway between the respective extremities of the said strips, the short-circuiting described will be avoided. After the strip $b^3$ has left the spool $k'$, and before $b^2$ has come onto $k^2$, the condition of affairs is as represented in Fig. 2. The distance between the shoes C and C', Fig. 1, is always greater than the distance between blocks, for reasons that are obvious. In the condition of affairs represented in Fig. 2 the block D is open. Block D' may be open or closed. Let it be first supposed that the shoe has not reached it and that it is closed. The current comes in at $k$ to $b^2$, passes through the car to $b^3$, and from there to $k^3$, and from $k^3$ to G⁷. This last point is beyond $b^5$, so that the current will thus flow, as described, whether D′ is opened or closed. After $b^2$ reaches $k^2$, D′ will have been opened, and whether D be open or shut the current will pass through the car in a manner similar to the way that has been described. The shoe C can now close D without breaking the circuit. As all these parts are arranged symmetrically, the same succession of events will take place, only in an inverse order, when the train is backing. Therefore whether the train be running forward or backward, or be at a standstill, the current will flow through the wire $d'$ uninterruptedly. A second conductor can be attached to the wires $l\ l'$, Fig. 3, and branch wires carried in the way herein described to a second set of spools, and a second set of metallic strips, similar to $b^2$ and $b^3$, be provided to bear on these spools, and in this way an additional current may be carried through the car. In the same manner this same key-block may be made to interrupt the current through a third main conductor, and a third set of spools and metallic strips provided for a third current to be carried through the car, and so on indefinitely, the only limit being the space required in which to place the spools and the metallic strips.

What we claim as our invention, and desire to secure by Letters Patent, is—

1. The combination, on a railroad, with a railroad-car provided with the shoes C C′ and the metallic strips $b^2$ and $b^3$, of a main-line electric conductor, the described rotary circuit breaking and closing key-blocks in the said line, and located at suitable distances apart along the road, and in position to engage the said shoes on the car, as specified, the spring spools or rollers located and arranged, as described, to engage said metallic strips, and the wire electrically connecting said strips and extending through the car, all as described, whereby as the car is moved over the road the main circuit is broken by the forward shoe and closed by the rear shoe on the car, and between the breaking and closing the circuit is switched through the car, as specified.

2. The described electric circuit breaking and closing metal key-block, having substantially the form described and shown, and provided with the springs $b\ b'$, and the spring $p$, the same being mounted to rotate on the fixed axle H, that is provided with the insulated metal studs $h\ h'$, connected to the circuit-wires $i\ i'$, all as and for the purpose specified.

3. The combination of the shoes C C′, attached one to the front truck and the other to the rear truck of a railroad-car, and the described key-blocks in the main-line conductor F, whereby the shoe on the forward truck as it passes over the key-block opens the circuit therein, and the shoe on the rear truck of same car as it passes over said block closes the circuit therein, all as described.

4. The combination, with a railroad-car, of a flexible electrical conductor extending between the trucks and attached to the car by springs, by which the same is kept taut, adapted to engage, as described, with conducting-surfaces in a line-conductor separate from the car, as and for the purpose specified.

CHARLES W. WILLIAMS.
GEO. S. BARNUM.
EDWARD B. IVES.

Witnesses for Charles W. Williams:
CARL ROSS,
W. T. WILLIAMS.
Witnesses for G. S. Barnum:
L. L. McCLESKEY,
W. A. WINBURN.
Witnesses for E. B. Ives:
A. G. N. VERMILYA,
A. S. FITCH.